US012574821B2

(12) United States Patent　　　　(10) Patent No.:　US 12,574,821 B2

Hannan　　　　　　　　　　　　　　(45) Date of Patent:　　Mar. 10, 2026

(54) DEVICE SELECTION IN VEHICLE FOR COMMUNICATION

(71) Applicant: QUALCOMM Incorporated, San Diego, CA (US)

(72) Inventor: John Hannan, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 455 days.

(21) Appl. No.: 18/176,032

(22) Filed: Feb. 28, 2023

(65) Prior Publication Data

US 2024/0292311 A1　　Aug. 29, 2024

(51) Int. Cl.
　　*H04W 40/22*　　　(2009.01)
　　*H04W 40/24*　　　(2009.01)
　　*H04W 76/10*　　　(2018.01)
　　*H04M 1/72409*　　(2021.01)

(52) U.S. Cl.
　　CPC ......... *H04W 40/22* (2013.01); *H04W 40/246* (2013.01); *H04W 76/10* (2018.02); *H04M 1/724098* (2022.02)

(58) Field of Classification Search
　　CPC .... H04W 40/22; H04W 76/10; H04W 40/246
　　See application file for complete search history.

(56) References Cited

U.S. PATENT DOCUMENTS

| | | | |
|---|---|---|---|
| 2004/0199637 A1* | 10/2004 | Li | ............................ H04L 9/40 |
| | | | 709/227 |
| 2012/0094630 A1 | 4/2012 | Wisnewski et al. | |
| 2012/0163255 A1 | 6/2012 | Choi | |
| 2016/0142941 A1 | 5/2016 | Ganesh et al. | |
| 2016/0344776 A1* | 11/2016 | Gonzalez De Langarica | .............. |
| | | | H04L 65/1063 |
| 2017/0208540 A1 | 7/2017 | Egner et al. | |
| 2018/0267773 A1* | 9/2018 | Kim | ...................... G06F 3/0482 |
| 2019/0279495 A1* | 9/2019 | Nishioka | .............. G08B 25/016 |
| 2020/0214071 A1* | 7/2020 | Xu | ......................... H04L 45/123 |
| 2022/0412768 A1* | 12/2022 | Sharifi | ................. G01C 21/367 |
| 2023/0066232 A1* | 3/2023 | Caro | .................. H04B 7/18517 |
| 2023/0396660 A1* | 12/2023 | Shetty | ................. H04L 41/5009 |
| 2024/0259877 A1* | 8/2024 | Moore | .................. H04W 16/14 |

OTHER PUBLICATIONS

International Search Report and Written Opinion—PCT/US2024/010541—ISA/EPO—May 2, 2024.

* cited by examiner

*Primary Examiner* — Michael Thier
*Assistant Examiner* — Tracy Lauren Raimondo
(74) *Attorney, Agent, or Firm* — Harrity & Harrity, LLP

(57)　　　　　　ABSTRACT

Various aspects of the present disclosure generally relate to wireless communication. In some aspects, a device may receive an instruction to initiate communication with a network entity. The device may select a lead device for the communication with the network entity, from among a plurality of wireless devices that include a first wireless device integrated in a vehicle and a second wireless device detected to be associated with the vehicle. The device may initiate the communication using the lead device. Numerous other aspects are described.

30 Claims, 14 Drawing Sheets

400 →

Network entity 510

Vehicle with
telematics

UE 520

Driver
Smartphone

UE 530

Infotainment
System

700

Figure 9:
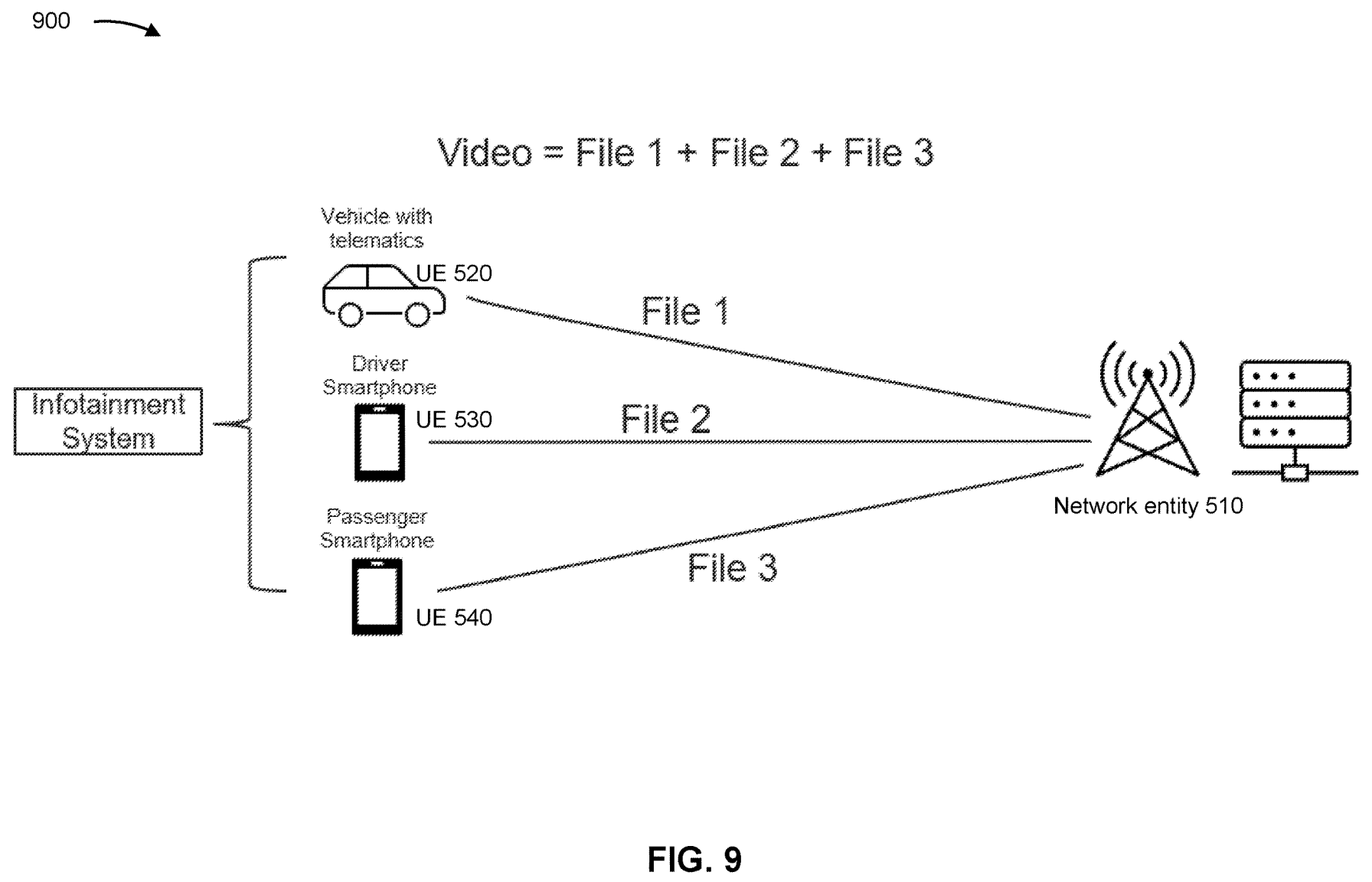

Video = File 1 + File 2 + File 3

Network entity 510

File 1

File 2

File 3

UE 520

Vehicle with telematics

Driver Smartphone

UE 530

Passenger Smartphone

UE 540

Infotainment System

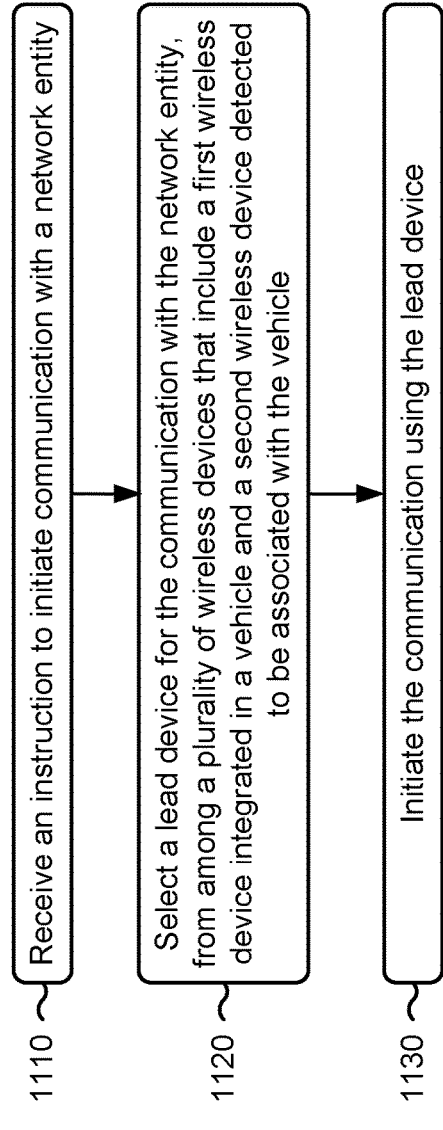

1100

1110　Receive an instruction to initiate communication with a network entity

1120　Select a lead device for the communication with the network entity, from among a plurality of wireless devices that include a first wireless device integrated in a vehicle and a second wireless device detected to be associated with the vehicle 1130　Initiate the communication using the lead device

FIG. 11

1210 Select a lead device in a vehicle for communication between the lead device and the network entity, from among a plurality of wireless devices that include a first wireless device integrated in the vehicle and a second wireless device detected to be associated with the vehicle 1220 Perform the communication with the lead device

1200

Reception Component 1402

Communication Manager 1406

Transmission Component 1404

1408

1400

DEVICE SELECTION IN VEHICLE FOR COMMUNICATION

FIELD OF THE DISCLOSURE

Aspects of the present disclosure generally relate to wireless communication and to techniques and apparatuses for selecting a device in a vehicle for communication.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a method of wireless communication performed by a device. The method may include receiving an instruction to initiate communication with a network entity. The method may include selecting a lead device for the communication with the network entity, from among a plurality of wireless devices that include a first wireless device integrated in a vehicle and a second wireless device detected to be associated with the vehicle. The method may include initiating the communication using the lead device.

Some aspects described herein relate to a method of wireless communication performed by a network entity. The method may include selecting a lead device in a vehicle for communication between the lead device and the network entity, from among a plurality of wireless devices that include a first wireless device integrated in the vehicle and a second wireless device detected to be associated with the vehicle. The method may include performing the communication with the lead device.

Some aspects described herein relate to a device for wireless communication. The device may include a memory and one or more processors coupled to the memory. The one or more processors may be configured to receive an instruction to initiate communication with a network entity. The one or more processors may be configured to select a lead device for the communication with the network entity, from among a plurality of wireless devices that include a first wireless device integrated in a vehicle and a second wireless device detected to be associated with the vehicle. The one or more processors may be configured to initiate the communication using the lead device.

Some aspects described herein relate to a network entity for wireless communication. The network entity may include a memory and one or more processors coupled to the memory. The one or more processors may be configured to select a lead device in a vehicle for communication between the lead device and the network entity, from among a plurality of wireless devices that include a first wireless device integrated in a vehicle and a second wireless device detected to be associated with the vehicle. The one or more processors may be configured to perform the communication with the lead device.

Some aspects described herein relate to a non-transitory computer-readable medium that stores a set of instructions for wireless communication by a device. The set of instructions, when executed by one or more processors of the device, may cause the device to receive an instruction to initiate communication with a network entity. The set of instructions, when executed by one or more processors of the device, may cause the device to select a lead device for the communication with the network entity, from among a plurality of wireless devices that include a first wireless device integrated in a vehicle and a second wireless device detected to be associated with the vehicle. The set of instructions, when executed by one or more processors of the device, may cause the device to initiate the communication using the lead device.

Some aspects described herein relate to a non-transitory computer-readable medium that stores a set of instructions for wireless communication by a network entity. The set of instructions, when executed by one or more processors of the network entity, may cause the network entity to select a lead device in a vehicle for communication between the lead device and the network entity, from among a plurality of wireless devices that include a first wireless device integrated in the vehicle and a second wireless device detected to be associated with the vehicle. The set of instructions, when executed by one or more processors of the network entity, may cause the network entity to perform the communication with the lead device.

Some aspects described herein relate to an apparatus for wireless communication. The apparatus may include means for receiving an instruction to initiate communication with a network entity. The apparatus may include means for selecting a lead apparatus for the communication with the network entity, from among a plurality of wireless devices that include a first wireless device integrated in a vehicle and a second wireless device detected to be associated with the vehicle. The apparatus may include means for initiating the communication using the lead device.

Some aspects described herein relate to an apparatus for wireless communication. The apparatus may include means for selecting a lead device in a vehicle for communication between the lead device and the apparatus, from among a plurality of wireless devices that include a first wireless device integrated in the vehicle and a second wireless device detected to be associated with the vehicle. The apparatus may include means for performing the communication with the lead device.

Aspects generally include a method, apparatus, system, computer program product, non-transitory computer-readable medium, user equipment, base station, network entity, network node, wireless communication device, mobile station, access point, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example of link aggregation, in accordance with the present disclosure.

FIG. 11 is a diagram illustrating an example process performed, for example, by a first wireless device, in accordance with the present disclosure.

DETAILED DESCRIPTION

Figure 1:
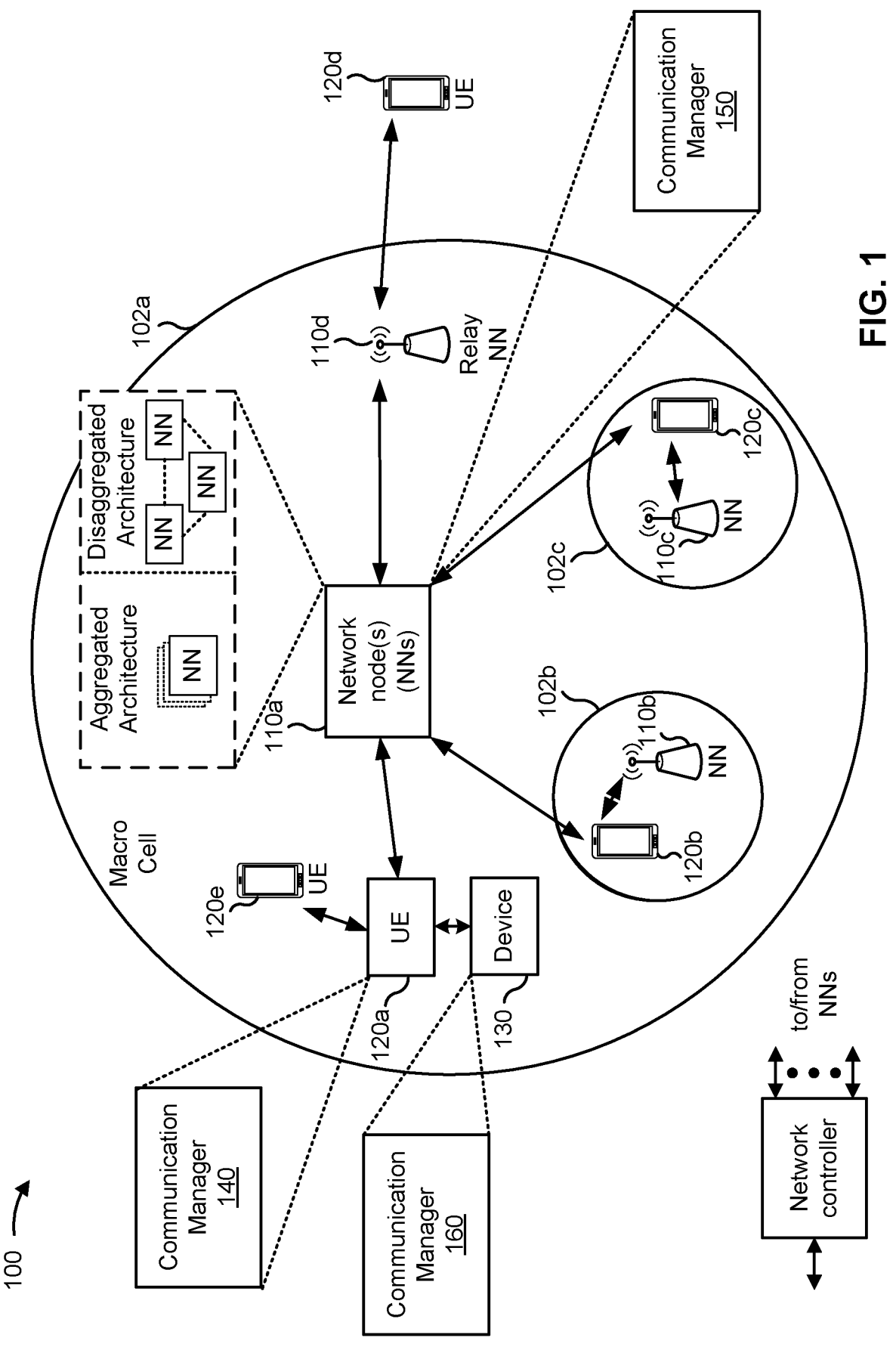
FIG. 1 is a diagram illustrating an example of a wireless network.

A vehicle may include a system that offers various features, such as audio, video, navigation, internet access, or the use of other applications. Such a system may provide both information and entertainment, and thus may be referred to as an "infotainment system." The system may include a wireless device that is integrated into the vehicle. The wireless device may be located in and may be a part of the vehicle. The vehicle may provide power to the wireless device, provide a user interface for operating the wireless device, and offer applications or features that utilize the wireless device. The driver of the vehicle may have another wireless device, such as a smartphone. The driver may make calls and communicate with other devices via a network entity (e.g., base station), which may be part of a wireless network. A passenger in the vehicle may also have a smartphone that can communicate with the network entity.

The wireless device integrated in the vehicle may detect that the driver's wireless device and the passenger's wireless device are associated with the vehicle. A wireless device may be associated with the vehicle if the wireless device is located in the vehicle, is connected to the vehicle (e.g., via a wireless connection or a wired connection), provides a notification to the wireless device integrated in the vehicle, or is preconfigured to be associated with the vehicle. The network entity may also provide a list of devices that can be associated with the vehicle. The list of devices from the network entity may be defined categorically (e.g., all wireless devices integrated into cars from a particular car manufacturer). Associated devices may also be discovered by the vehicle (e.g., devices in or integrated in other vehicles).

While the driver's wireless device may communicate with the network entity, the communication link between the driver's wireless device and the network entity may not be the best communication link in terms of quality, speed, and/or reliability. For example, the wireless device integrated in the vehicle or a passenger's device may provide a better or less costly communication link to the network entity than the driver's wireless device. Using less than optimal communication links may waste power, money, processing resources, and signaling resources.

According to various aspects described herein, a driver or a passenger may initiate a communication, via the driver's wireless device, a user interface of the vehicle, or a passenger's wireless device. A device that is part of the infotainment system or that coordinates with the infotainment system and a wireless device integrated in the vehicle may select a lead device from among the wireless device integrated in the vehicle, the driver's wireless device, and the passenger's wireless device. The lead device may establish a communication link with the network entity and communicate using the communication link. The lead device may be selected based at least in part on pricing, a link quality, speed, and/or a capability of the wireless devices. In some aspects, the network entity may select the lead device. By selecting a lead device that can provide a better and/or less costly communication link, a wireless device in a vehicle conserves power, money, processing resources, and/or signaling resources.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller may couple to or communicate with a set of network nodes 110 and may provide coordination and control for these network nodes 110. The network controller may communicate with the network nodes 110 via a backhaul communication link or a midhaul communication link. The network nodes 110 may communicate with one another directly or indirectly via a wireless or wireline backhaul communication link. In some aspects, the network controller may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHZ). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With these examples in mind, unless specifically stated otherwise, the term "sub-6 GHZ," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, while a UE 120 is described herein using terminology commonly associated with 3GPP, a UE 120 may also be configured to operate using other RATs, including operating according to Institute of Electrical Engineers (IEEE) standards (e.g., IEEE 802) or using ultra-wideband (UWB) technologies. For example, the UE 120 may operate as an access point (AP) or a mobile station (STA) in a wireless local area network (WLAN), such as a Wi-Fi network. The WLAN can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be).

A single AP and an associated set of STAs may be referred to as a basic service set (BSS), which is managed by the respective AP that serves a basic service area (BSA) of the WLAN. The BSS may be identified to users by a service set identifier (SSID), as well as to other devices by a basic service set identifier (BSSID), which may be a medium access control (MAC) address of the AP. An AP and STAs may transmit and receive wireless communications to and from one another in the form of physical layer convergence protocol (PLCP) protocol data units (PPDUs). The AP and the STA may transmit PPDUs over an unlicensed spectrum, which may be a portion of spectrum that includes frequency bands traditionally used by Wi-Fi technology, such as the 2.4 GHz band, the 5.0 GHz band, the 60 GHz band, the 3.6 GHz band, and the 900 MHz band. Some implementations of the AP and STAs may communicate in other frequency bands, such as the 6.0 GHz band, which may support both licensed and unlicensed communications. The AP and STAs may also be configured to communicate over other frequency bands such as shared licensed frequency bands, where multiple operators may have a license to operate in the same or overlapping frequency band or bands.

In some aspects, a device (e.g., device 130, UE 120) may include a communication manager 140 or 160. As described in more detail elsewhere herein, the communication manager 140 or 160 may receive an instruction to initiate communication with a network entity. The communication manager 140 or 160 may select a lead device for the communication with the network entity, from among a plurality of wireless devices that include a first wireless device integrated in a vehicle and a second wireless device detected to be associated with the vehicle. The communication manager 140 or 160 may initiate the communication using the lead device. Additionally, or alternatively, the communication manager 140 or 160 may perform one or more other operations described herein.

In some aspects, a network entity (e.g., network node 110) may include a communication manager 150. As described in more detail elsewhere herein, the communication manager 150 may select a lead device in a vehicle for communication between the lead device and the network entity, from among two or more wireless devices that include a first wireless device integrated in the vehicle and a second wireless device in the vehicle. The communication manager 150 may perform the communication with the lead device. Additionally, or alternatively, the communication manager 150 may perform one or more other operations described herein.

As indicated above, FIG. 1 is provided as an example. Other examples may differ from what is described with regard to FIG. 1.

Figure 2:
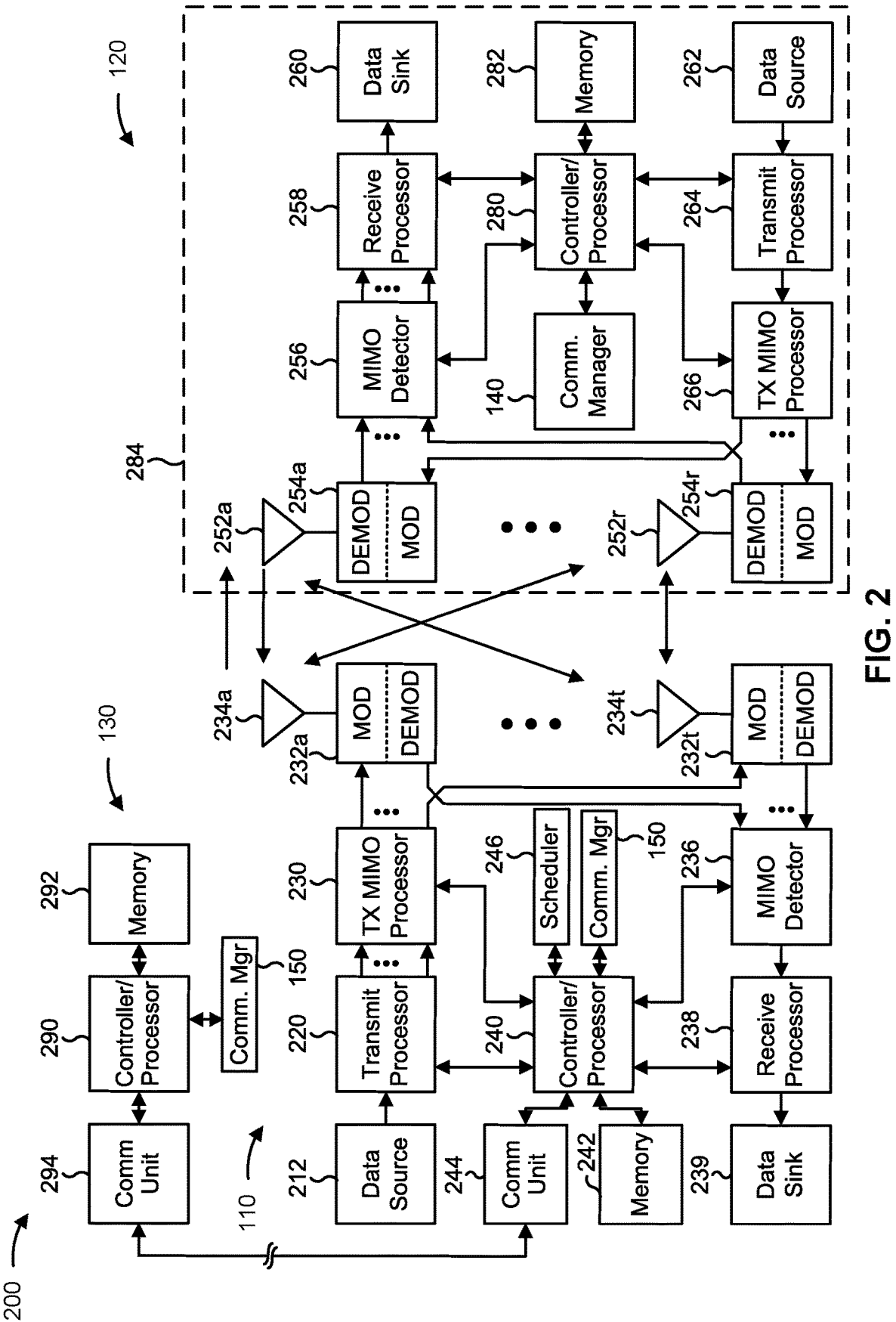
FIG. 2 is a diagram illustrating an example of a network node in communication with a user equipment (UE) in a wireless network.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

A device associated with an infotainment system of a vehicle may include a communication unit 294, a controller/processor 290, and a memory 292. The device may include, be included in, or communicate with a wireless device integrated in the vehicle or other wireless devices or network entities via the wireless device integrated in the vehicle.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 4-14).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 4-14).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

A controller/processor of a network entity (e.g., controller/processor 240 of the network node 110, controller/processor of an access point), the controller/processor 280 of the UE 120, the controller/processor 290 of the device 130, or any other component(s) of FIG. 2 may perform one or more techniques associated with selecting a device in a vehicle for communication, as described in more detail elsewhere herein. In some aspects, the device described herein is the device 130, is included in the device 130, or includes one or more components of the device 130 shown in FIG. 2. In some aspects, the device described herein is the UE 120, is included in the UE 120, coordinates with the UE 120, or includes one or more components of the UE 120 shown in FIG. 2. For example, the controller/processor 240 of the network node 110, the controller/processor 280 of the UE 120, the controller processor 290 of the device 130, or any other component(s) (or combinations of components) of FIG. 2 may perform or direct operations of, for example, process 1100 of FIG. 11, process 1200 of FIG. 12, and/or other processes as described herein. The memory 242, the memory 282, and the memory 292 may store data and program codes for the network node 110, the UE 120, and the device 130, respectively. In some examples, the memory 242, the memory 282, and the memory 292 may include a non-transitory computer-readable medium storing one or more instructions (for example, code or program code) for wireless communication. For example, the one or more instructions, when executed (for example, directly, or after compiling, converting, or interpreting) by one or more processors of the network node 110, the UE 120, or the device 130, may cause the one or more processors, the UE 120, the network node 110, or the device 130 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, a device (e.g., a device 130, a UE 120, AP, STA) includes means for receiving an instruction to initiate communication with a network entity; means for selecting a lead device for the communication with the network entity, from among a plurality of wireless devices that include a first wireless device integrated in a vehicle and a second wireless device detected to be associated with the vehicle; and/or means for initiating the communication using the lead device. In some aspects, the means for the first wireless device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., network node 110, AP) includes means for selecting a lead device in a vehicle for communication between the lead device and the network entity, from among two or more wireless devices that include a first wireless device integrated in the vehicle and a second wireless device in the vehicle; and/or means for performing the communication with the lead device. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
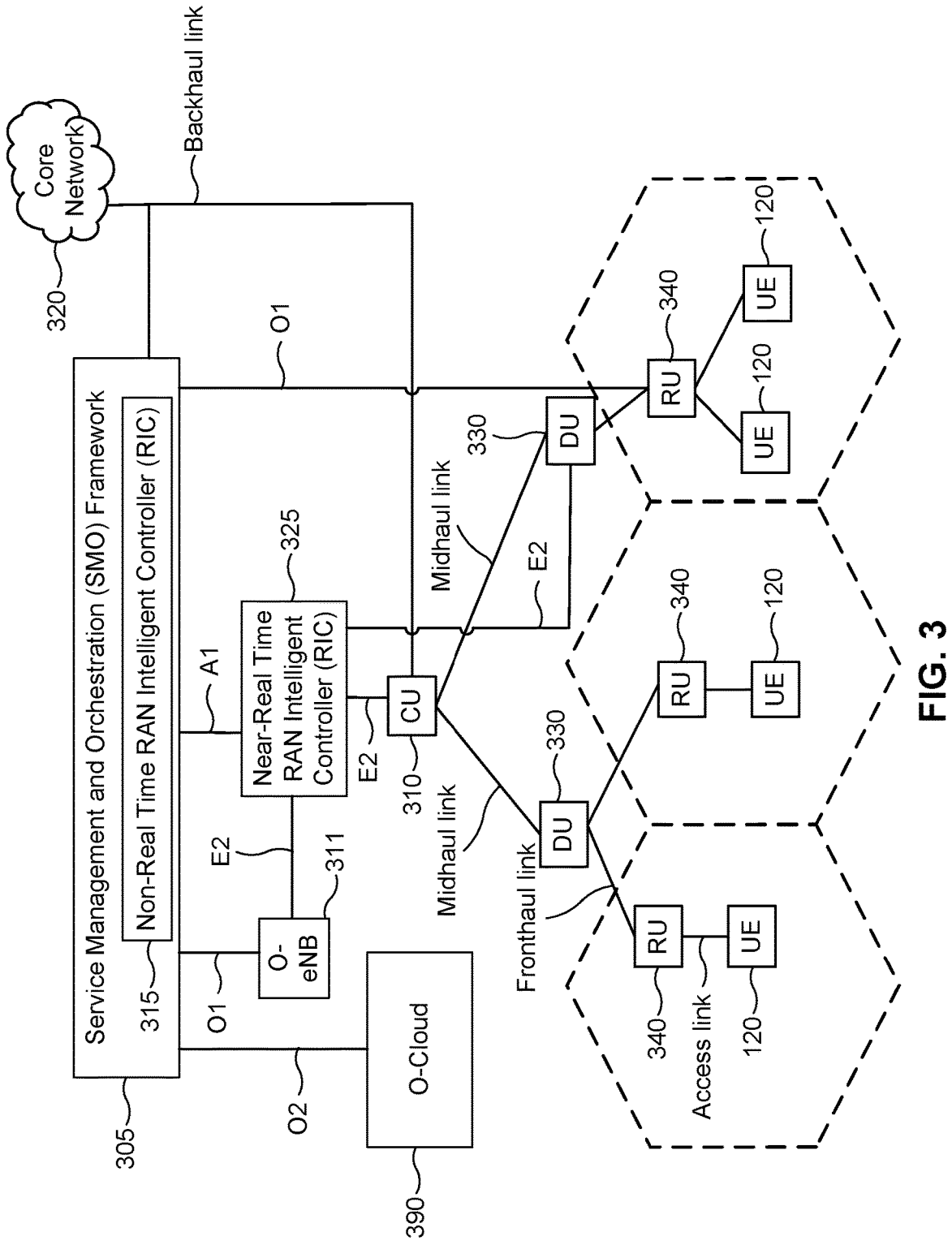
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
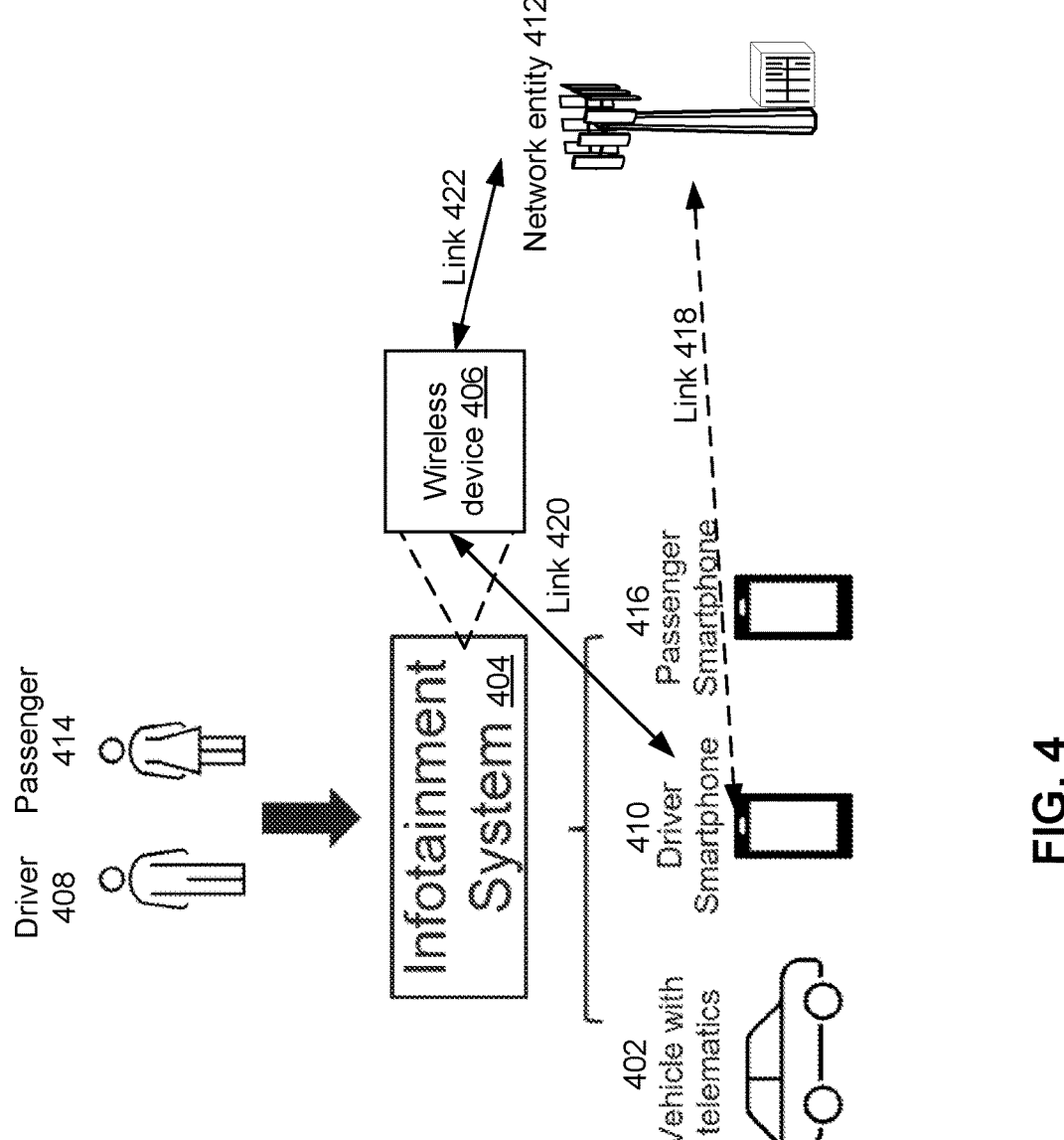
FIG. 4 is a diagram illustrating an example of an infotainment system, in accordance with the present disclosure.

FIG. 4 is a diagram illustrating an example 400 of an infotainment system, in accordance with the present disclosure.

A vehicle 402 may include a system that offers various features, such as audio, video, navigation, internet access, or the use of other applications. Such a system may provide both information and entertainment, and thus may be referred to as an "infotainment system." The infotainment system 404 may include a wireless device 406 that is integrated into the vehicle 402. The wireless device 406 may be located in and may be a part of the vehicle 402, and thus the vehicle 402 may be considered to have telematics. The vehicle 402 may provide power to the wireless device 406, provide a user interface for operating the wireless device 406, and offer applications or features that utilize the wireless device 406. The driver 408 of the vehicle 402 may have another wireless device, such as a smartphone 410. The driver 408 may make calls and communicate with other devices via a network entity 412 (e.g., base station), which may be part of a wireless network. A passenger 414 in the vehicle 402 may also have a smartphone 416 that can communicate with the network entity.

The wireless device 406 integrated in the vehicle 402 may detect that the driver's smartphone 410 and the passenger's smartphone 416 are associated with the vehicle 402. A wireless device may be associated with the vehicle 402 if the wireless device is located in the vehicle 402, is connected to the vehicle 402 (e.g., via a wireless connection or a wired connection), provides a notification to the wireless device 406, or is preconfigured to be associated with the system of the vehicle 402.

While the driver's smartphone 410 may communicate with the network entity 412, the communication link 418 between the driver's smartphone 410 and the network entity 412 may not be the best communication link in terms of quality, speed, and/or reliability. For example, the wireless device 406 or the passenger's smartphone 416 may provide a better or less costly communication link to the network entity 412 than the driver's smartphone 410. Using less than optimal communication links may waste power, money, processing resources, and signaling resources.

According to various aspects described herein, when the driver 408 initiates a communication, via the driver's smartphone 410 or a user interface of the vehicle 402, a device that is part of the infotainment system or that coordinates with the infotainment system and the wireless device 406 may select a lead device from among the wireless device 406, the driver's wireless device (driver's smartphone 410) and any passenger wireless devices (e.g., passenger's smartphone 416). In example 400, the lead device is the wireless device 406. The lead device may establish a communication link (e.g., link 420 and link 422) with the network entity 412 and communicate using the communication link. The lead device may be selected based at least in part on pricing, a link quality, speed, and/or a capability of the wireless devices. For example, the driver's smartphone may have higher subscription pricing for communications than the wireless device 406, or the quality of link 422 may be greater than the quality of link 418. In some aspects, the network entity 412 may select the lead device based at least in part on information about wireless devices in the vehicle. By selecting a lead device that provides a better and/or less costly communication link, a wireless device in a vehicle conserves power, money, processing resources, and/or signaling resources.

As indicated above, FIG. 4 is provided as an example. Other examples may differ from what is described with regard to FIG. 4.

Figure 5:
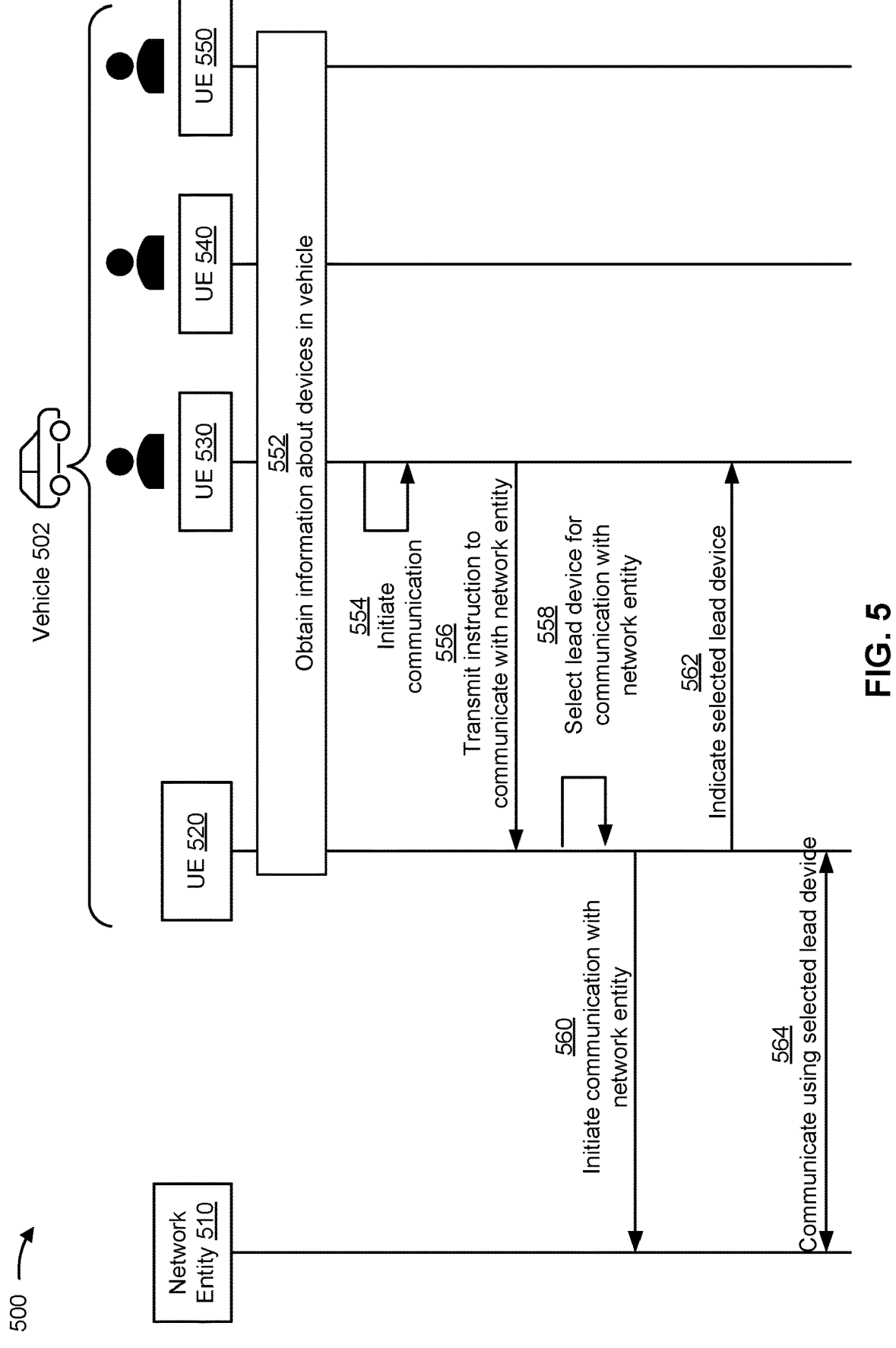
FIG. 5 is a diagram illustrating an example associated with selecting a lead device, in accordance with the present disclosure.

FIG. 5 is a diagram illustrating an example 500 associated with selecting a lead device, in accordance with the present disclosure. As shown in FIG. 5, a network entity 510 (e.g., network node 110) may communicate with a UE 520 (e.g., UE 120) integrated in a vehicle 502 and any other wireless devices in the vehicle 502 such as a driver UE 530, a passenger UE 540, and a passenger UE 550. The UEs may communication using a wireless network (e.g., wireless network 100). The UE 520 may include, be included in, or coordinate with a device (e.g., device 130) of the infotainment system of the vehicle 502. In example 500, the UE 520 includes such a device.

As shown by reference number 552, the network entity 510 may obtain information about wireless devices in the vehicle 502. For example, the integrated UE 520 may detect wireless devices associated with the vehicle. This may include requesting and receiving information from wireless devices in the vehicle. Driver UE 530, passenger UE 540, and/or passenger UE 550 may be preconfigured (e.g., registered, paired) with the infotainment system (e.g., infotainment system 404) of the vehicle 502. Integrated UE 520 may transmit information about the wireless devices in the vehicle 502 to the network entity 510. The network entity 510 may also detect that the wireless devices are in the vehicle 502 via network operations or communications.

Driver UE 530 (or a passenger UE) may start to make a phone call, and integrated UE 520 may select a lead device for communication via network entity 510. As shown by reference number 554, driver UE 530 may initiate a communication (e.g., phone call). As shown by reference number 556, driver UE 530 may transmit a message (e.g., instruction) for communication with the network entity 510. For example, driver UE 530 may indicate a number to call (e.g., look up contact saved in system). Driver UE 530 may have a capability for and may be configured to coordinate communications with integrated UE 520. The driver may also use the user interface of the infotainment system (e.g., select a contact to call via a touchscreen, press a button on the wheel and speak to the infotainment system).

As shown by reference number 558, integrated UE 520 may select a lead device for the communication with the network entity 510. Integrated UE 520 may select the lead device based at least in part on one or more factors, such as pricing for the integrated UE 520, pricing for driver UE 530, pricing for passenger UE 540, and pricing for passenger UE 550. For example, integrated UE 520 may compare a current price per minute (e.g., voice) or price per megabyte (e.g., data or voice over internet protocol (VOIP)) and/or other current pricing considerations. Based upon the location, a user may incur roaming charges on one device but another device from another user may not incur roaming charges. Different devices may incur different pricings based upon the time of day. There may be usage-based plans or unlimited plans, where an unlimited usage plan may be preferred over a monthly quota-based plan. There may also be user configurable settings. For example, a user may define considerations for which device to use, such as "choose device A until the monthly quota reaches 80% of the quota, then choose device B if its quota is below a threshold." Integrated UE 520 may also select a particular device whenever that particular device is available.

Another factor may include a link quality (e.g., signal strength, reliability, frequency band) for the integrated UE 520, a link quality for driver UE 530, a link quality for passenger UE 540, and a link quality for passenger UE 550. For example, integrated UE 520 may compare the link budgets across eligible devices and select an optimal device based at least in part on antenna gain, internal versus external antennas (penetration loss), a quantity of antennas, a device noise factor, a device power amplifier, and/or a transmit power. Parameter-based decisions may involve a normalized signal-to-noise ratio (SNR), a bit error rate, measurements across devices, an RSRP, and/or network loading information from the operator (e.g., a set of frequency bands may be currently underutilized and selected to help optimize network efficiency).

A factor may include a capability (e.g., performance, antenna configuration, radio, processing power, battery power, specifications, position) of the integrated UE 520, a capability of driver UE 530, a capability of passenger UE 540, and a capability of passenger UE 550. For example, integrated UE 520 may compare technology capabilities, such as comparing 4G versus 5G devices, comparing frequency band support from eligible devices, and/or comparing a maximum data rate per eligible device.

In some aspects, integrated UE 520 may poll all eligible wireless devices associated with the vehicle 502. For example, if pricing is the criterion used to make the decision, each wireless device connected to the infotainment system may be polled to inquire if the wireless device is eligible for use (e.g., is the device currently idle and available to make a call), if the wireless device shares a pricing plan or subscription with the primary user (e.g., driver UE 530, passenger UE 540), what pricing option to select for the call, and/or about other factors (e.g., current usage, monthly quota). Integrated UE 520 may select the lead device that is the optimal device to initiate the call. For example, integrated UE 520 may select the wireless device with the lowest pricing plan across all eligible devices, select a wireless device with an unlimited plan rather than a plan with a monthly limit, and/or select a wireless device that has the lowest usage of a user's monthly limit.

In some aspects, integrated UE 520 may utilize one or more machine learning models. Applications residing on integrated UE 520 may store logs of call quality and reliability across different historical routes that a user frequents (e.g., driving from home to work or school, common trips, usual roads). This information may be input into a machine learning model to predict which device may best handle a type of communication on a specific route. The machine learning model may be trained and/or executed at the infotainment system or at the network level. As the driver is driving and initiating a call, integrated UE 520 may predict and consider the route taken when selecting the lead device. Integrated UE 520 may determine route information from the navigation system of the infotainment system, a navigation application on driver UE 530, or machine learning that is based on driver habits (e.g., route, time, scheduled activity). Integrated UE 520 may select the wireless device that offers the optimal call quality and/or a highest reliability score. Additionally, this information may be updated during the call. Different wireless devices may have different quality and/or reliability at different sections of the route. If predicted reliability changes in the route, another wireless device may offer improved scores. Integrated UE 520 may select that device as the lead device. This may include handing off the call.

As shown by reference number 560, integrated UE 520 may initiate communication with the network entity 510 (e.g., start call to contact). As shown by reference number 562, integrated UE 520 may indicate the selected lead device to driver UE 530, such that driver UE 530 hangs up and the call is started or continues with integrated UE 520. As shown by reference number 564, the network entity 510 may communicate using the selected lead device, which is integrated UE 520. The communication may be terminated via the user interface or driver UE 530. Other applications may include video calls, file downloads, navigation, sidelink communications, V2V communications (e.g., bent-pipe communications through another vehicle), V2X communications, or other activities. In some aspects, integrated UE 520 may select another wireless device as the lead device, such as passenger UE 540 or passenger UE 550. This may include establishing a communication link between integrated UE 520 and a selected passenger UE.

In some aspects, selecting the lead device may include receiving a user selection of the lead device from a user interface of the infotainment system. For example, the infotainment system may present a list of options and also criteria to consider for the lead device and then the user may select the lead device (e.g., use driver UE 530 if least costly or integrated UE 520 if most reliable).

As indicated above, FIG. 5 is provided as an example. Other examples may differ from what is described with respect to FIG. 5.

Figure 6:
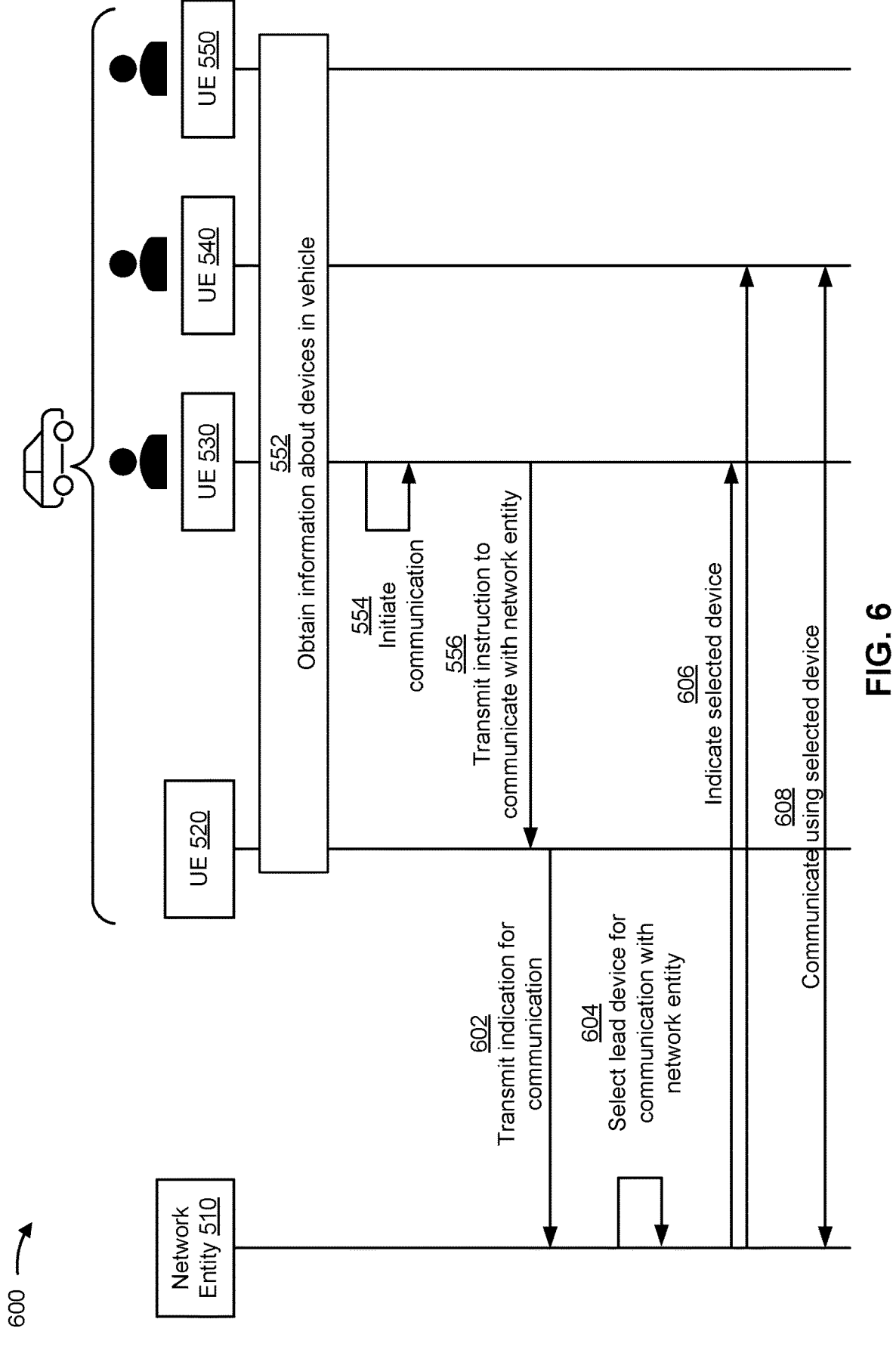
FIG. 6 is a diagram illustrating another example associated with selecting a lead device, in accordance with the present disclosure.

FIG. 6 is a diagram illustrating another example 600 associated with selecting a lead device, in accordance with the present disclosure. While integrated UE 520 selects the lead device in example 500 of FIG. 5, in example 600, the network entity 510 may select the lead device.

Example 600 differs from example 500 after the instruction is transmitted by driver UE 530 (reference number 556). As shown by reference number 602, rather than selecting the lead device, integrated UE 520 may transmit an indication for the communication. As shown by reference number 604, the network entity 510 may select the lead device for communicating with the network entity 510. The network entity 510 may select the lead device based at least in part on at least the same factors described in connection with example 500 of FIG. 5 or in connection with other figures. The network entity 510 may also have information about which device may provide the best and/or least costly communication link. In example 600, the network entity 510 has selected passenger UE 540 to handle the communication.

In some aspects, a wireless device associated with the vehicle 502 may have a better device configuration and offer a lower transmit power (and thus lower interference) than another wireless device. For example, integrated UE 520 may have an external higher gain antenna compared to a smartphone inside the car (with penetration loss) with lower gain antennas. Integrated UE 520 may have a modem that would reduce network interference and make the network more efficient (e.g., better able to handle more calls, provide better data experience).

As shown by reference number 606, the network entity 510 may indicate the selected lead device to driver UE 530 (if driver UE 530 initiated the communication) and to the selected lead device, which is passenger UE 540. As shown by reference number 608, the passenger UE 540 may handle the communication with the network entity 510.

As indicated above, FIG. 6 is provided as an example. Other examples may differ from what is described with respect to FIG. 6.

Figure 7:
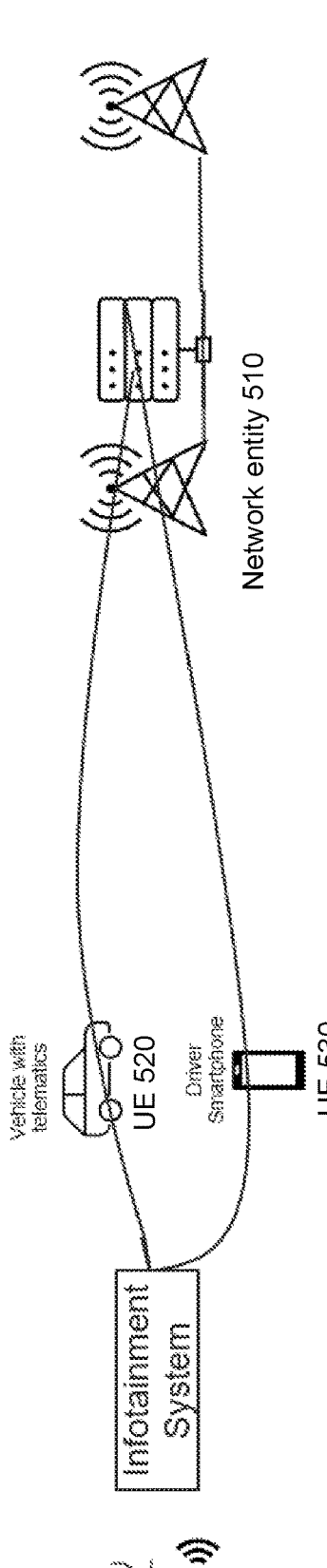
FIG. 7 is a diagram illustrating an example of an infotainment system handing off a call, in accordance with the present disclosure.

FIG. 7 is a diagram illustrating an example 700 of an infotainment system handing off a call, in accordance with the present disclosure.

In some aspects, integrated UE 520 may determine that an existing communication (e.g., phone call) may be handed off to another wireless device. For example, if the call quality degrades for the communication via integrated UE 520, integrated UE 520 may hand off the call to another wireless device and another communication link. Driver UE 530 may initiate a new call, where the transition to the new call is transparent to the user.

In some aspects, the call handoff may proceed similarly to a handoff using voice call continuity (VCC). The handoff may be between a cellular radio and Wi-Fi within the same device (e.g., within integrated UE 520). The handoff may be performed based at least in part on mobility and/or a cell change. For example, the cost for a link may increase when entering a roaming zone.

In some aspects, the network entity 510 may complete the establishment of a call and simultaneously run a query to see if additional eligible devices are available and better suited to handle the call. If the call is placed through driver UE 530, the network entity 510 may detect other eligible devices, including integrated UE 520. The network entity 510 may determine whether integrated UE 520 is online and under the same serving cell as driver UE 530. The network entity 510 may determine, by positioning or contact, whether a particular wireless device is available. The network entity 510 may then hand off the call to a more optimal wireless device.

There may be existing wireless devices, such as routers, that currently offer the capability to aggregate data across more than one modem (e.g., a router that offers cable or fiber wired modem and a cellular modem). The multiple modems offer the ability to aggregate traffic as well as higher reliability (e.g., if one modem service fails, the second modem service may still be available). Alternate implementations may involve a router placed within the wireless network, and applications that reside on each device may perform the aggregation. In some aspects, the call may be improved (e.g., higher signal strength, higher reliability) by using both communication links simultaneously. Integrated UE 520 may switch between two analog outputs to send to the speaker or combine the analog outputs. Switching may include selecting a new lead device, establishing a communication link with the new lead device, and terminating a communication link to the old lead device. In some aspects, integrated UE 520 may periodically assess the frame qualities from each communication link and select the best frames to send along to the end user. The communication link may be selected for each frame or group of frames.

A request to download content may be received at a wireless network router that coordinates with a content server to provide the data. The router may also distribute the content out to the different devices being aggregated at the user's end. Additional software on each of the devices may be alerted to receive the data and may be instructed to deliver the data to the destination device. The device software may also combine different pieces of data.

As indicated above, FIG. 7 is provided as an example. Other examples may differ from what is described with regard to FIG. 7.

Figure 8:
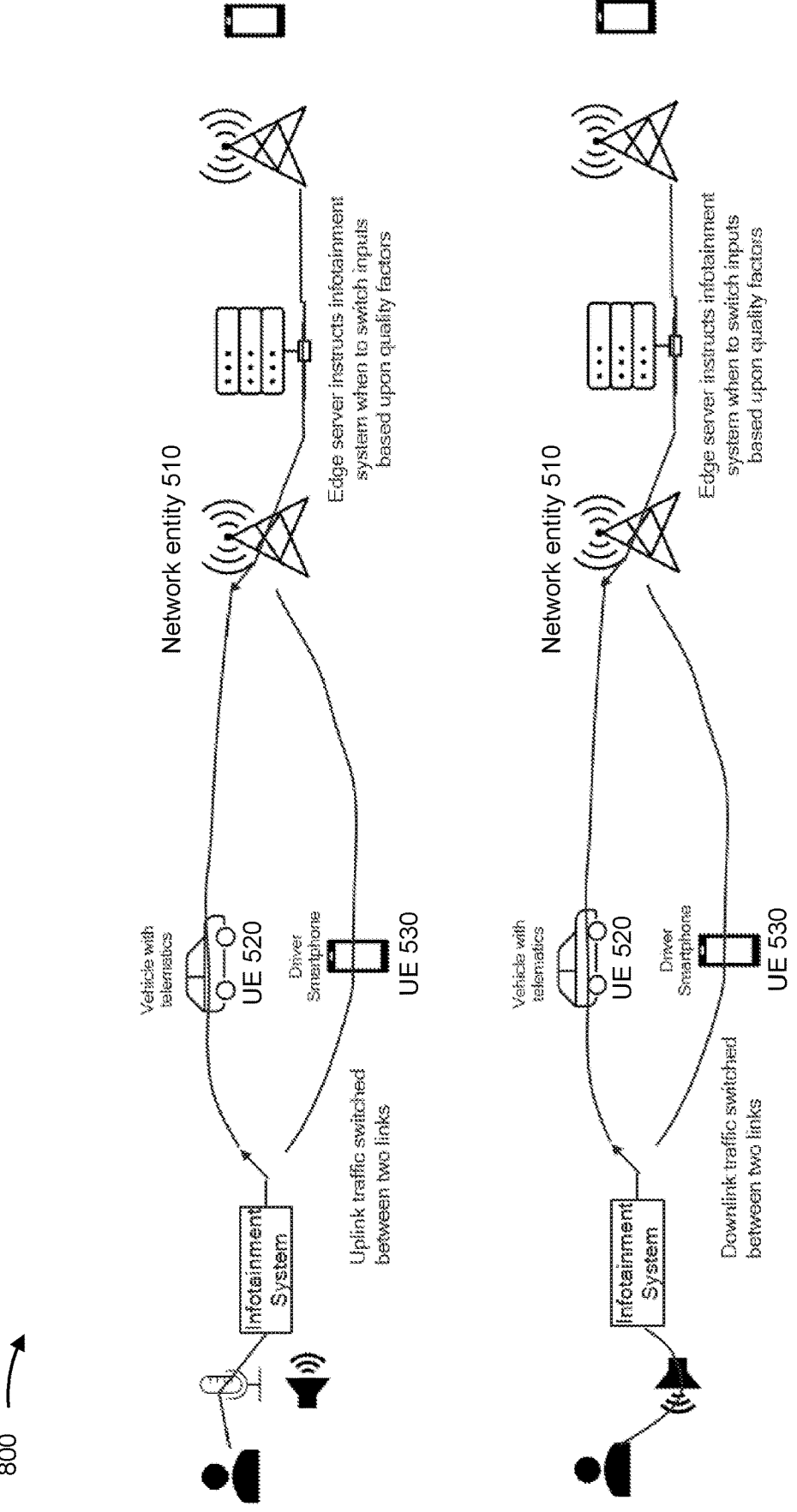
FIG. 8 is a diagram illustrating an example of link switching, in accordance with the present disclosure.

FIG. 8 is a diagram illustrating an example 800 of link switching, in accordance with the present disclosure.

Example 800 shows that traffic may be switched between two communication links for uplink traffic and/or for downlink traffic. For improved call reliability, integrated UE 520 may maintain two active links and switch between the two active links to optimize call quality and reliability, where traffic is sent through one link at a time.

Edge servers help to offload some of the processing and data storage for wireless devices or network entities. In some aspects, an edge server may handle some of the processing or decision making for link switching. For example, the edge server may instruct the infotainment system (integrated UE 520) when to switch inputs or links based at least in part on one or more factors. The factors may include pricing, signaling strength, capability, traffic conditions, channel conditions, and/or energy saving. The switching may apply to inputs or links in the uplink direction or in the downlink direction.

As indicated above, FIG. 8 is provided as an example. Other examples may differ from what is described with regard to FIG. 8.

FIG. 9 is a diagram illustrating an example 900 of link aggregation, in accordance with the present disclosure.

Example 900 shows that, depending on data rates and/or reliability, multiple devices may perform link aggregation over multiple communication links. Integrated UE 520 may select the multiple lead devices and help set up the communication links. An application server may segment the video into pieces and determine which pieces are to be sent on which link.

For example, if the driver or a passenger in the vehicle requests a movie (e.g., a large video file), the download of the video may involve a large file that is split into multiple files among the multiple links. Each smaller file may be transmitted on a separate link. For example, integrated UE 520 may download file 1 of the video download, driver UE 530 may download file 2, and passenger UE 540 may download file 3. The infotainment system (e.g., video application) may coordinate with the devices to combine file 1, file 2, and file 3 into the complete larger file for the video download.

Wireless device may be aggregated based at least in part on a variety of factors. Devices in the vehicle 502 may share a pricing plan that offers device aggregation, or may be subscribed to a service with a device aggregation feature. Applications that offer this feature may allow a user to donate a portion of a wireless device for use by others. On the other hand, the wireless device may benefit from leveraging other wireless devices for the service. The wireless devices may all be in the same vehicle or in different vehicles traveling alongside one another. Vehicles from a common manufacturer (e.g., phone or auto) may have incentives to offer such a service as a benefit to customers. Phones from the same operator may share consumer benefits as well as network optimization opportunities. Integrated UE 520 may leverage underutilized devices and frequency bands to quickly clear download requests and free up resources for new requests.

As indicated above, FIG. 9 is provided as an example. Other examples may differ from what is described with regard to FIG. 9.

Figure 10:
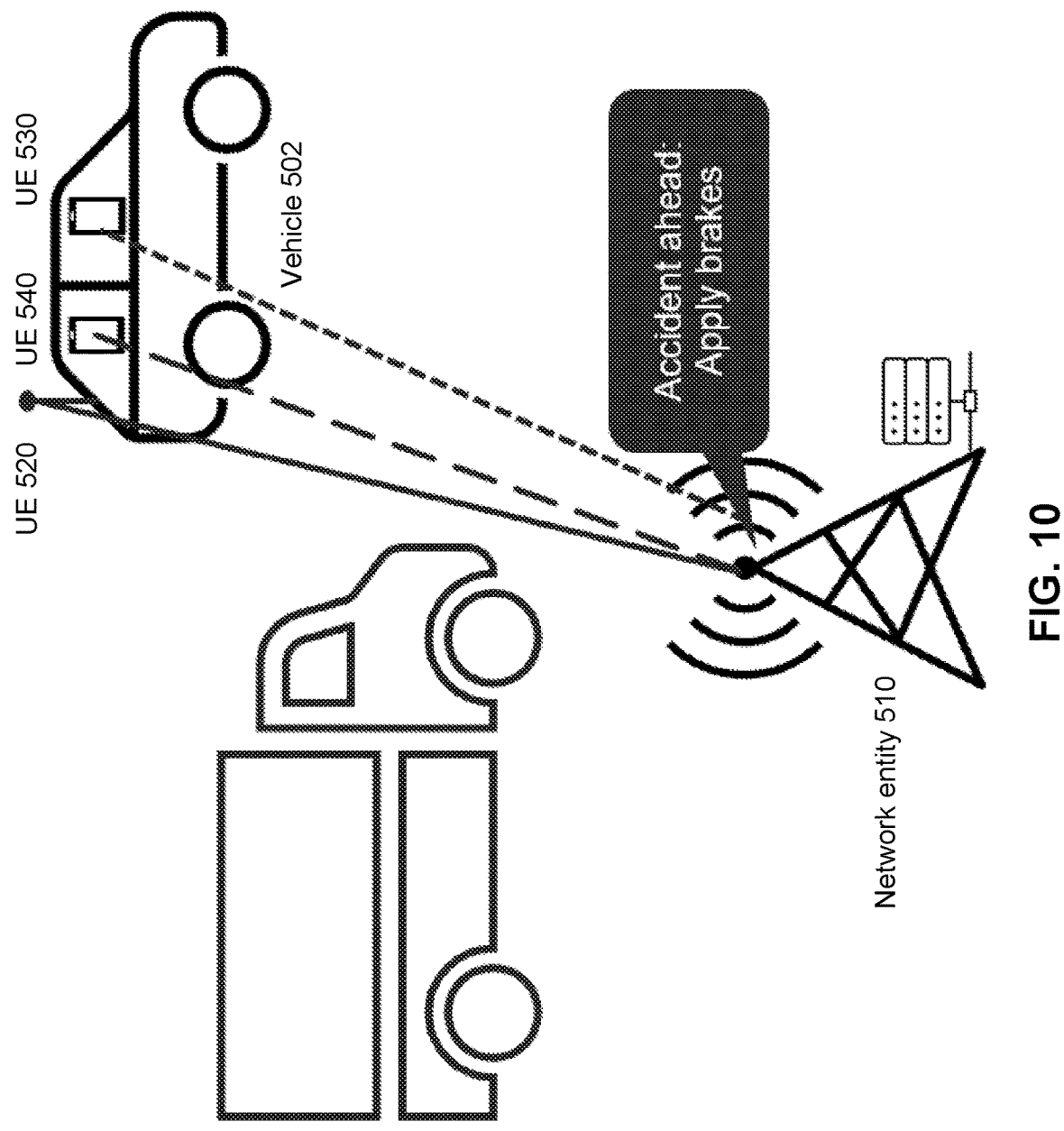
FIG. 10 is a diagram illustrating an example of messaging to multiple devices in a vehicle, in accordance with the present disclosure.

FIG. 10 is a diagram illustrating an example 1000 of messaging to multiple devices in a vehicle, in accordance with the present disclosure.

In some aspects, if an emergency message (e.g., apply brakes) is to be transmitted to the vehicle 502 with high reliability, a wireless device (e.g., network entity 510) outside the vehicle 502 may transmit the emergency message on multiple communication links to multiple wireless devices associated with the vehicle, rather than just one device. The emergency message may be a broadcast to all vehicles and devices in the area. The emergency message may be transmitted directly from another vehicle, a pedestrian, or another device. Increased reliability means no extra time is used for retransmission of the emergency message. For example, the network entity 510 may transmit the emergency message to integrated UE 520, driver UE 530, and passenger UE 540. In this way, there is a better chance that the driver (or the vehicle 502) can act on the emergency message in time. As a result, safety improves.

As indicated above, FIG. 10 is provided as an example. Other examples may differ from what is described with regard to FIG. 10.

FIG. 11 is a diagram illustrating an example process 1100 performed, for example, by a device, in accordance with the present disclosure. Example process 1100 is an example where the device (e.g., device 130, UE 120, integrated UE 520, STA, AP) performs operations associated with selecting a wireless device in a vehicle for communication.

As shown in FIG. 11, in some aspects, process 1100 may include receiving an instruction to initiate communication with a network entity (block 1110). For example, the device (e.g., using reception component 1302 and/or communication manager 1306 depicted in FIG. 13) may receive an instruction to initiate communication with a network entity, as described above.

As further shown in FIG. 11, in some aspects, process 1100 may include selecting a lead device for the communication with the network entity, from among a plurality of wireless devices that include a first wireless device integrated in a vehicle and a second wireless device detected to be associated with the vehicle (block 1120). For example, the first wireless device (e.g., using communication manager 1306 depicted in FIG. 13) may select a lead device for the communication with the network entity, from among a plurality of wireless devices that include a first wireless device integrated in a vehicle and a second wireless device detected to be associated with the vehicle, as described above.

As further shown in FIG. 11, in some aspects, process 1100 may include initiating the communication using the lead device (block 1130). For example, the first wireless device (e.g., using communication manager 1306 depicted in FIG. 13) may initiate the communication using the lead device, as described above.

Process 1100 may include additional aspects, such as any single aspect or any combination of aspects described below and/or in connection with one or more other processes described elsewhere herein.

In a first aspect, receiving the instruction includes receiving the instruction in a message from the second wireless device.

In a second aspect, alone or in combination with the first aspect, receiving the instruction includes receiving the instruction via a user interface of the vehicle.

In a third aspect, alone or in combination with one or more of the first and second aspects, process 1100 includes detecting a third wireless device in the vehicle that is available to be a lead device, where selecting the lead device includes selecting the lead device from among the first wireless device, the second wireless device, and the third wireless device.

In a fourth aspect, alone or in combination with one or more of the first through third aspects, initiating the communication includes establishing a communication link between the first wireless device and the network entity.

In a fifth aspect, alone or in combination with one or more of the first through fourth aspects, initiating the communication includes transmitting a message to the second wireless device that indicates that the first wireless device will establish the communication link.

In a sixth aspect, alone or in combination with one or more of the first through fifth aspects, the plurality of wireless devices includes a third wireless device detected to be associated with the vehicle, and initiating the communication includes establishing a communication link between the third wireless device located in the vehicle and the network entity.

In a seventh aspect, alone or in combination with one or more of the first through sixth aspects, initiating the communication includes transmitting a message to the second wireless device and the third wireless device that indicates that the third wireless device will establish the communication link.

In an eighth aspect, alone or in combination with one or more of the first through seventh aspects, the communication is associated with a voice call, a video call, downloading an audio file or a video file, a navigation application, or information that is transmitted to or received from a wireless device in another vehicle.

In a ninth aspect, alone or in combination with one or more of the first through eighth aspects, the communication includes a handoff to another communication link.

In a tenth aspect, alone or in combination with one or more of the first through ninth aspects, selecting the lead device includes selecting the lead device based at least in part on pricing associated with the first wireless device and pricing associated with the second wireless device.

In an eleventh aspect, alone or in combination with one or more of the first through tenth aspects, selecting the lead device includes selecting the lead device based at least in part on a signal strength of the first wireless device and a signal strength of the second wireless device.

In a twelfth aspect, alone or in combination with one or more of the first through eleventh aspects, selecting the lead device includes selecting the lead device based at least in part on a capability of the first wireless device and a capability of the second wireless device.

In a thirteenth aspect, alone or in combination with one or more of the first through twelfth aspects, selecting the lead device includes selecting the lead device based at least in part on machine learning information about historical routes associated with one or more of the first wireless device or the second wireless device.

In a fourteenth aspect, alone or in combination with one or more of the first through thirteenth aspects, process 1100 includes switching between a first communication link between the first wireless device and the network entity and a second communication link between the second wireless device and the network entity, where switching between the first communication link and the second communication link includes selecting a new lead device.

In a fifteenth aspect, alone or in combination with one or more of the first through fourteenth aspects, process 1100 includes performing carrier aggregation with a first communication link between the first wireless device and the network entity and a second communication link between the second wireless device and the network entity.

In a sixteenth aspect, alone or in combination with one or more of the first through fifteenth aspects, process 1100 includes performing link aggregation with a first communication link between the first wireless device and the network entity, a second communication link between the second wireless device and the network entity, and a third communication link between a third wireless device in the vehicle and the network entity.

In a seventeenth aspect, alone or in combination with one or more of the first through sixteenth aspects, process 1100 includes receiving a message from the network entity that indicates the lead device that is to be selected, where selecting the lead device includes selecting the lead device based at least in part on the message.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
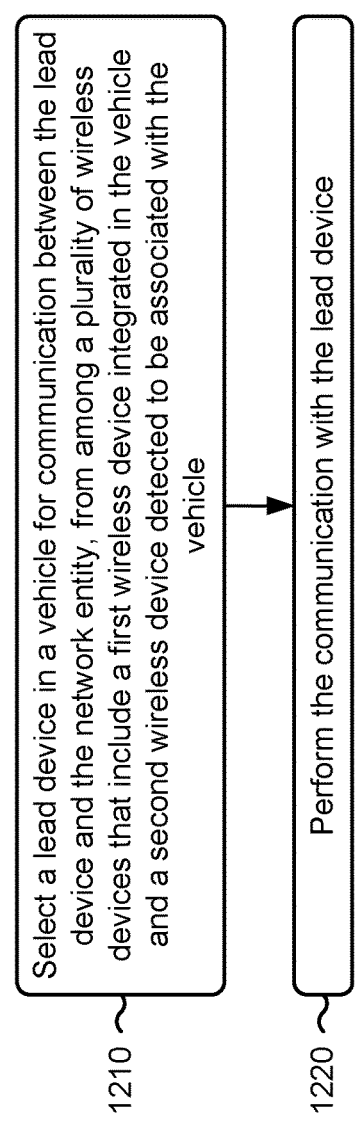
FIG. 12 is a diagram illustrating an example process performed, for example, by a network entity, in accordance with the present disclosure.

FIG. 12 is a diagram illustrating an example process 1200 performed, for example, by a network entity, in accordance with the present disclosure. Example process 1200 is an example where the network entity (e.g., network node 110, network entity 510, AP) performs operations associated with selecting a wireless device in a vehicle for communication.

As shown in FIG. 12, in some aspects, process 1200 may include selecting a lead device in a vehicle for communication between the lead device and the network entity, from among a plurality of wireless devices that include a first wireless device integrated in the vehicle and a second wireless device detected to be associated with the vehicle (block 1210). For example, the network entity (e.g., using communication manager 1406 depicted in FIG. 14) may select a lead device in a vehicle for communication between the lead device and the network entity, from among a plurality of wireless devices that include a first wireless device integrated in the vehicle and a second wireless device detected to be associated with the vehicle, as described above.

As further shown in FIG. 12, in some aspects, process 1200 may include performing the communication with the lead device (block 1220). For example, the network entity (e.g., using communication manager 1406 depicted in FIG. 14) may perform the communication with the lead device, as described above.

Process 1200 may include additional aspects, such as any single aspect or any combination of aspects described below and/or in connection with one or more other processes described elsewhere herein.

In a first aspect, selecting the lead device includes selecting the lead device based at least in part on initiation of the communication by the first wireless device or the second wireless device.

In a second aspect, alone or in combination with the first aspect, process 1200 includes detecting a third wireless device in the vehicle that is available to be the lead device, where selecting the lead device includes selecting the lead device from among the first wireless device, the second wireless device, and the third wireless device.

In a third aspect, alone or in combination with one or more of the first and second aspects, process 1200 includes transmitting an emergency message to the first wireless device, the second wireless device, and the third wireless device.

In a fourth aspect, alone or in combination with one or more of the first through third aspects, process 1200 includes transmitting a message to the first wireless device that indicates that the lead device is to perform the communication with the network entity.

In a fifth aspect, alone or in combination with one or more of the first through fourth aspects, selecting the lead device includes selecting the lead device based at least in part on pricing of the first wireless device and pricing of the second wireless device.

In a sixth aspect, alone or in combination with one or more of the first through fifth aspects, selecting the lead device includes selecting the lead device based at least in part on a signal strength of the first wireless device and a signal strength of the second wireless device.

In a seventh aspect, alone or in combination with one or more of the first through sixth aspects, selecting the lead device includes selecting the lead device based at least in part on a capability of the first wireless device and a capability of the second wireless device.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
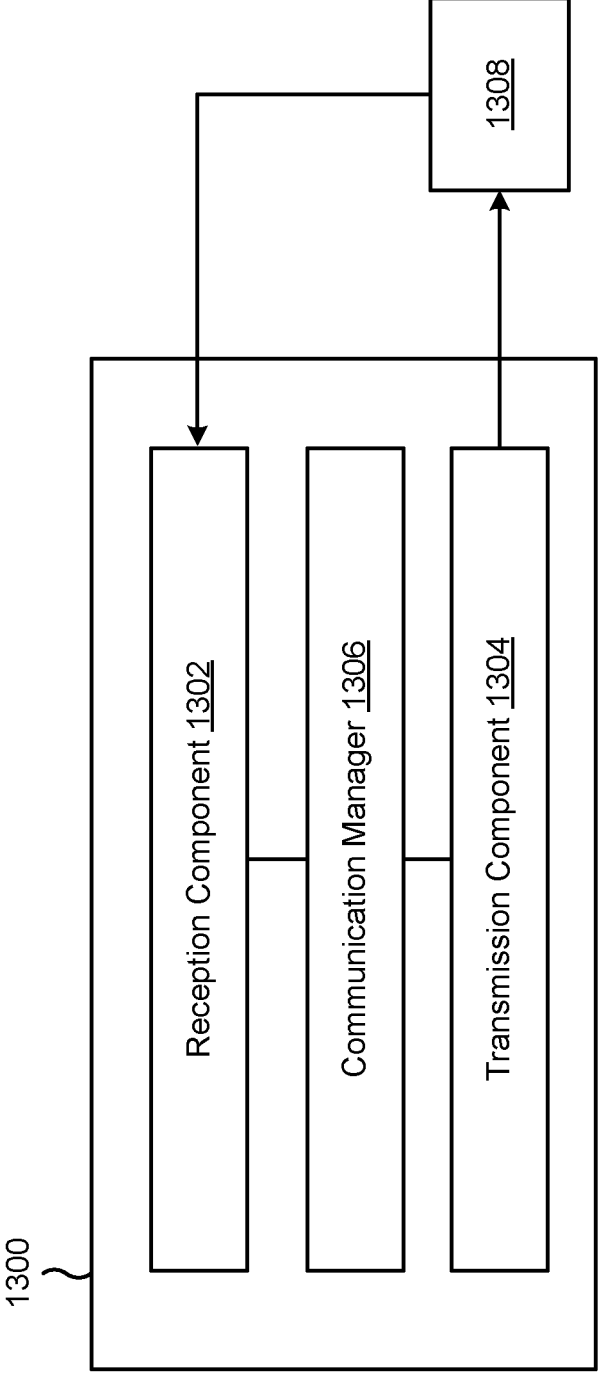
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a wireless device (e.g., device 130, UE 120, STA, AP), or a wireless device may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 140 or 160 described in connection with FIG. 1. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 1-10. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the wireless device described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the wireless device described in connection with FIG. 2.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, a modem, a modulator, a transmit MIMO processor, a transmit processor, a controller/processor, a memory, or a combination thereof, of the wireless device described in connection with FIG. 2. In some aspects, the transmission component 1304 may be co-located with the reception component 1302 in a transceiver.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The reception component 1302 may receive an instruction to initiate communication with a network entity. The communication manager 1306 may select a lead device for the communication with the network entity, from among a plurality of wireless devices that include a first wireless device integrated in a vehicle and a second wireless device detected to be associated with the vehicle. The communication manager 1306 may initiate the communication using the lead device.

The communication manager 1306 may detect a third wireless device in the vehicle that is available to be a lead device, where selecting the lead device includes selecting the lead device from among the first wireless device, the second wireless device, and the third wireless device.

The communication manager 1306 may switch between a first communication link between the first wireless device and the network entity and a second communication link between the second wireless device and the network entity, where switching between the first communication link and the second communication link includes selecting a new lead device.

The communication manager 1306 may perform carrier aggregation with a first communication link between the first wireless device and the network entity and a second communication link between the second wireless device and the network entity.

The reception component 1302 may receive a message from the network entity that indicates the lead device that is to be selected, where selecting the lead device includes selecting the lead device based at least in part on the message.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
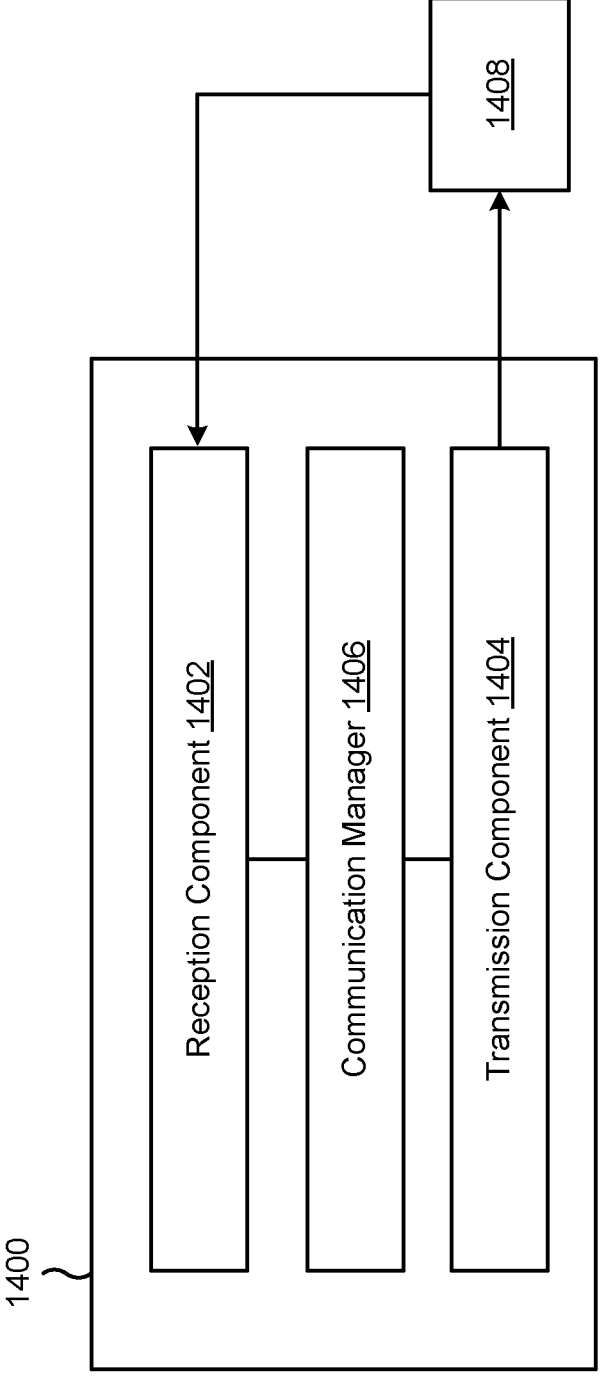
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a network entity (e.g., network node 110, AP), or a network entity may include the apparatus 1400. In some aspects, the apparatus 1400 includes a reception component 1402, a transmission component 1404, and/or a communication manager 1406, which may be in communication with one another (for example, via one or more buses and/or one or more other components). In some aspects, the communication manager

1406 is the communication manager 150 described in connection with FIG. 1. As shown, the apparatus 1400 may communicate with another apparatus 1408, such as a UE or a network node (such as a CU, a DU, an RU, or a base station), using the reception component 1402 and the transmission component 1404.

In some aspects, the apparatus 1400 may be configured to perform one or more operations described herein in connection with FIGS. 1-10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the network entity described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1408. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the network entity described in connection with FIG. 2.

The transmission component 1404 may transmit communications, such as reference signals, control information, data communications, or a combination thereof, to the apparatus 1408. In some aspects, one or more other components of the apparatus 1400 may generate communications and may provide the generated communications to the transmission component 1404 for transmission to the apparatus 1408. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1404 may include one or more antennas, a modem, a modulator, a transmit MIMO processor, a transmit processor, a controller/processor, a memory, or a combination thereof, of the network entity described in connection with FIG. 2. In some aspects, the transmission component 1404 may be co-located with the reception component 1402 in a transceiver.

The communication manager 1406 may support operations of the reception component 1402 and/or the transmission component 1404. For example, the communication manager 1406 may receive information associated with configuring reception of communications by the reception component 1402 and/or transmission of communications by the transmission component 1404. Additionally, or alternatively, the communication manager 1406 may generate and/or provide control information to the reception component 1402 and/or the transmission component 1404 to control reception and/or transmission of communications.

The communication manager 1406 may select a lead device in a vehicle for communication between the lead device and the network entity, from among a plurality of wireless devices that include a first wireless device integrated in the vehicle and a second wireless device detected to be associated with the vehicle. The communication manager 1406 may perform the communication with the lead device.

The communication manager 1406 may detect a third wireless device in the vehicle that is available to be the lead device, where selecting the lead device includes selecting the lead device from among the first wireless device, the second wireless device, and the third wireless device.

The transmission component 1404 may transmit an emergency message to the first wireless device, the second wireless device, and the third wireless device. The transmission component 1404 may transmit a message to the first wireless device that indicates that the lead device is to perform the communication with the network entity.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The foregoing disclosure provides illustration and description but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a device, comprising: receiving an instruction to initiate communication with a network entity; selecting a lead device for the communication with the network entity, from among a plurality of wireless devices that include a first wireless device integrated in a vehicle and a second wireless device detected to be associated with the vehicle; and initiating the communication using the lead device.

Aspect 2: The method of Aspect 1, wherein receiving the instruction includes receiving the instruction in a message from the second wireless device.

Aspect 3: The method of any of Aspects 1-2, wherein receiving the instruction includes receiving the instruction via a user interface of the vehicle.

Aspect 4: The method of any of Aspects 1-3, further comprising detecting a third wireless device in the vehicle that is available to be a lead device, wherein selecting the lead device includes selecting the lead device from among the first wireless device, the second wireless device, and the third wireless device.

Aspect 5: The method of any of Aspects 1-4, wherein initiating the communication includes establishing a communication link between the first wireless device and the network entity.

Aspect 6: The method of Aspect 5, wherein initiating the communication includes transmitting a message to the second wireless device that indicates that the first wireless device will establish the communication link.

Aspect 7: The method of any of Aspects 1-6, wherein the plurality of wireless devices includes a third wireless device detected to be associated with the vehicle, and wherein initiating the communication includes establishing a communication link between the third wireless device located in the vehicle and the network entity.

Aspect 8: The method of Aspect 7, wherein initiating the communication includes transmitting a message to the second wireless device and the third wireless device that indicates that the third wireless device will establish the communication link.

Aspect 9: The method of any of Aspects 1-8, wherein the communication is associated with a voice call, a video call, downloading an audio file or a video file, a navigation application, or information that is transmitted to or received from a wireless device in another vehicle.

Aspect 10: The method of any of Aspects 1-9, wherein the communication includes a handoff to another communication link.

Aspect 11: The method of any of Aspects 1-10, wherein selecting the lead device includes selecting the lead device based at least in part on pricing associated with the first wireless device and pricing associated with the second wireless device.

Aspect 12: The method of any of Aspects 1-11, wherein selecting the lead device includes selecting the lead device based at least in part on a signal strength of the first wireless device and a signal strength of the second wireless device.

Aspect 13: The method of any of Aspects 1-12, wherein selecting the lead device includes selecting the lead device based at least in part on a capability of the first wireless device and a capability of the second wireless device.

Aspect 14: The method of any of Aspects 1-13, wherein selecting the lead device includes selecting the lead device based at least in part on machine learning information about historical routes associated with one or more of the first wireless device or the second wireless device.

Aspect 15: The method of any of Aspects 1-14, further comprising switching between a first communication link between the first wireless device and the network entity and a second communication link between the second wireless device and the network entity, wherein switching between the first communication link and the second communication link includes selecting a new lead device.

Aspect 16: The method of any of Aspects 1-15, further comprising performing carrier aggregation with a first communication link between the first wireless device and the network entity and a second communication link between the second wireless device and the network entity.

Aspect 17: The method of any of Aspects 1-16, further comprising performing link aggregation with a first communication link between the first wireless device and the network entity, a second communication link between the second wireless device and the network entity, and a third communication link between a third wireless device in the vehicle and the network entity.

Aspect 18: The method of any of Aspects 1-17, further comprising receiving a message from the network entity that indicates the lead device that is to be selected, wherein selecting the lead device includes selecting the lead device based at least in part on the message.

Aspect 19: A method of wireless communication performed by a network entity, comprising: selecting a lead device in a vehicle for communication between the lead device and the network entity, from among a plurality of wireless devices that include a first wireless device integrated in the vehicle and a second wireless device detected to be associated with the vehicle; and performing the communication with the lead device.

Aspect 20: The method of Aspect 19, wherein selecting the lead device includes selecting the lead device based at least in part on initiation of the communication by the first wireless device or the second wireless device.

Aspect 21: The method of any of Aspects 19-20, further comprising detecting a third wireless device in the vehicle that is available to be the lead device, wherein selecting the lead device includes selecting the lead device from among the first wireless device, the second wireless device, and the third wireless device.

Aspect 22: The method of Aspect 21, further comprising transmitting an emergency message to the first wireless device, the second wireless device, and the third wireless device.

Aspect 23: The method of any of Aspects 19-22, further comprising transmitting a message to the first wireless device that indicates that the lead device is to perform the communication with the network entity.

Aspect 24: The method of any of Aspects 19-23, wherein selecting the lead device includes selecting the lead device based at least in part on pricing of the first wireless device and pricing of the second wireless device.

Aspect 25: The method of any of Aspects 19-24, wherein selecting the lead device includes selecting the lead device based at least in part on a signal strength of the first wireless device and a signal strength of the second wireless device.

Aspect 26: The method of any of Aspects 19-25, wherein selecting the lead device includes selecting the lead device based at least in part on a capability of the first wireless device and a capability of the second wireless device.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include random access memory (RAM), read only memory (ROM), electronically-erasable programmable ROM (EEPROM), compact disc ROM (CD-ROM) or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes CD, laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A device, comprising:
one or more memories; and
one or more processors, coupled to the one or more memories, configured to cause the device to:
   receive an instruction to initiate communication with a network entity;
   select a lead device for the communication with the network entity, from among a plurality of wireless devices that include the device as a first wireless device integrated in a vehicle and a second wireless device detected to be associated with the vehicle; and
   initiate the communication using the lead device, the communication comprising link aggregation with a plurality of communication links established between the network entity and the plurality of wireless devices.

2. The device of claim 1, wherein the one or more processors, to receive the instruction, are configured to receive the instruction in a message from the second wireless device.

3. The device of claim 1, wherein the one or more processors, to receive the instruction, are configured to receive the instruction via a user interface of the vehicle.

4. The device of claim 1, wherein the one or more processors are configured to detect a third wireless device in the vehicle that is available to be a lead device, and wherein the one or more processors, to select the lead device, are configured to select the lead device from among the first wireless device, the second wireless device, and the third wireless device.

5. The device of claim 1, wherein the one or more processors, to initiate the communication, are configured to establish a communication link between the first wireless device and the network entity.

6. The device of claim 5, wherein the one or more processors, to initiate the communication, are configured to transmit a message to the second wireless device that indicates that the first wireless device will establish the communication link.

7. The device of claim 1, wherein the plurality of wireless devices includes a third wireless device detected to be associated with the vehicle, and wherein the one or more processors, to initiate the communication, are configured to establish a communication link between the third wireless device located in the vehicle and the network entity.

8. The device of claim 7, wherein the one or more processors, to initiate the communication, are configured to transmit a message to the second wireless device and the third wireless device that indicates that the third wireless device will establish the communication link.

9. The device of claim 1, wherein the communication is associated with a voice call, a video call, downloading an audio file or a video file, a navigation application, or information that is transmitted to or received from a wireless device in another vehicle.

10. The device of claim 1, wherein the communication includes a handoff to another communication link.

11. The device of claim 1, wherein the one or more processors, to select the lead device, are configured to select the lead device based at least in part on pricing associated with the first wireless device and pricing associated with the second wireless device.

12. The device of claim 1, wherein the one or more processors, to select the lead device, are configured to select the lead device based at least in part on a signal strength of the first wireless device and a signal strength of the second wireless device.

13. The device of claim 1, wherein the one or more processors, to select the lead device, are configured to select the lead device based at least in part on a capability of the first wireless device and a capability of the second wireless device.

14. The device of claim 1, wherein the one or more processors, to select the lead device, are configured to select the lead device based at least in part on machine learning information about historical routes associated with one or more of the first wireless device or the second wireless device.

15. The device of claim 1, wherein the one or more processors are configured to perform carrier aggregation with a first communication link between the first wireless device and the network entity and a second communication link between the second wireless device and the network entity.

16. The device of claim 1, wherein the plurality of communication links include a first communication link between the first wireless device and the network entity, a second communication link between the second wireless device and the network entity, and a third communication link between a third wireless device in the vehicle and the network entity, and
   wherein the one or more processors are configured to perform the link aggregation with the first communication link, the second communication link, and the third communication link.

17. The device of claim 1, wherein the one or more processors are configured to receive a message from the network entity that indicates the lead device that is to be selected, and wherein the one or more processors, to select the lead device, are configured to select the lead device based at least in part on the message.

18. A network entity for wireless communication, comprising:
one or more memories; and
one or more processors, coupled to the one or more memories, configured to cause the network entity to:
   select a lead device in a vehicle for communication between the lead device and the network entity, from among a plurality of wireless devices that include a first wireless device integrated in the vehicle and a second wireless device detected to be associated with the vehicle; and
   perform the communication with the lead device, the communication comprising link aggregation with a plurality of communication links established between the network entity and the plurality of wireless devices.

19. The network entity of claim 18, wherein the one or more processors, to select the lead device, are configured to select the lead device based at least in part on initiation of the communication by the first wireless device or the second wireless device.

20. The network entity of claim 18, wherein the one or more processors are configured to detect a third wireless device in the vehicle that is available to be the lead device, and wherein the one or more processors, to select the lead device, are configured to select the lead device from among the first wireless device, the second wireless device, and the third wireless device.

21. The network entity of claim 20, wherein the one or more processors are configured to transmit an emergency message to the first wireless device, the second wireless device, and the third wireless device.

22. The network entity of claim 18, wherein the one or more processors are configured to transmit a message to the first wireless device that indicates that the lead device is to perform the communication with the network entity.

23. The network entity of claim 18, wherein the one or more processors, to select the lead device, are configured to select the lead device based at least in part on pricing of the first wireless device and pricing of the second wireless device.

24. The network entity of claim 18, wherein the one or more processors, to select the lead device, are configured to select the lead device based at least in part on a signal strength of the first wireless device and a signal strength of the second wireless device.

25. The network entity of claim 18, wherein the one or more processors, to select the lead device, are configured to select the lead device based at least in part on a capability of the first wireless device and a capability of the second wireless device.

26. A method of wireless communication performed by a device, comprising:

receiving an instruction to initiate communication with a network entity;

selecting a lead device for the communication with the network entity, from among a plurality of wireless devices that include the device as a first wireless device integrated in a vehicle and a second wireless device detected to be associated with the vehicle; and initiating the communication using the lead device, the communication comprising link aggregation with a plurality of communication links established between the network entity and the plurality of wireless devices.

27. The method of claim 26, further comprising detecting a third wireless device in the vehicle that is available to be a lead device, wherein selecting the lead device includes selecting the lead device from among the first wireless device, the second wireless device, and the third wireless device.

28. The method of claim 26, wherein selecting the lead device includes selecting the lead device based at least in part on pricing associated with the first wireless device and pricing associated with the second wireless device, a signal strength of the first wireless device and a signal strength of the second wireless device, or a capability of the first wireless device and a capability of the second wireless device.

29. A method of wireless communication performed by a network entity, comprising:

selecting a lead device in a vehicle for communication between the lead device and the network entity, from among a plurality of wireless devices that include a first wireless device integrated in the vehicle and a second wireless device detected to be associated with the vehicle; and performing the communication with the lead device, the communication comprising link aggregation with a plurality of communication links established between the network entity and the plurality of wireless devices.

30. The method of claim 29, wherein the first wireless device is selected as the lead device.

* * * * *